(No Model.)
C. M. BURGESS.
KNOB ATTACHMENT
No. 472,725. Patented Apr. 12, 1892.
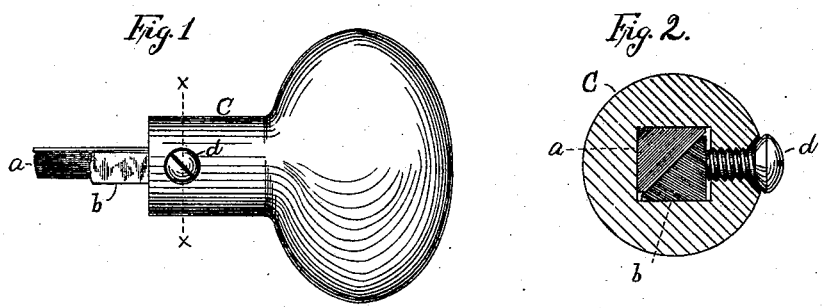
Witnesses.
Arthur G. Beach.
Chas C. Higby
Inventor.
Charles M. Burgess.
By James Shepard
Atty.

UNITED STATES PATENT OFFICE.

CHARLES M. BURGESS, OF NEW BRITAIN, CONNECTICUT, ASSIGNOR TO THE RUSSELL & ERWIN MANUFACTURING COMPANY, OF SAME PLACE.

KNOB ATTACHMENT.

SPECIFICATION forming part of Letters Patent No. 472,725, dated April 12, 1892.

Application filed December 19, 1891. Serial No. 415,632. (No model.)

*To all whom it may concern:*

Be it known that I, CHARLES M. BURGESS, a citizen of the United States, residing at New Britain, in the county of Hartford and State of Connecticut, have invented certain new and useful Improvements in Knob Attachments, of which the following is a specification.

My invention relates to an improved knob attachment; and the object of my improvement is to provide a simple and efficient attachment in which the spindle will better fit the hole in the knob and thereby enable the knob and spindle to be more securely attached.

In the accompanying drawings, Figure 1 is a side elevation of a portion of my knob-spindle with knob attached thereto; and Fig. 2 is an enlarged sectional view thereof on the line $x\ x$ of Fig. 1, the fastening-screw being shown in elevation.

I make the knob-spindle of two longitudinal parts $a\ b$, each of which is in cross-section substantially in the form of a trapezoid or right-angled triangle. These two parts when placed with their oblique faces together form the complete knob-spindle, which is rectangular in cross-section and which will substantially fit the ordinary hole or socket in the knob-shank C. This knob-spindle will of course be of the usual or any desired length and extend through the hub of the latch.

The knob-shank C should be provided with some suitable fastening device, which I prefer to make in the form of a screw $d$, extending through a threaded hole in the knob-shank, so that the end of said screw may be forced upon one of the right-angular side faces of the knob-spindle without entering a hole in said spindle. The knob may be slipped along to the desired point on the complete spindle and then secured by turning in the screw. The screw will bear upon one part of the spindle—as, for instance, the part $b$—and force that part against the other part $a$, when under the action of the oblique faces of said two parts the spindle will be expanded, so to speak, and take a firm bearing on three sides of the socket, while it is held firmly upon the fourth side by the screw. Thus dividing the spindle longitudinally, with the confronting faces of the two parts extending obliquely to its sides, enables me to make said spindle have a firm bearing upon all sides of the socket when the knob is secured thereto, so that it is not liable to be accidentally displaced even when fastened by merely turning up the screw. The spindle will also have a firmer and better bearing in the latch-hub, while at the same time there is no perforation, either threaded or otherwise, in either part of said spindle.

I claim as my invention—

The herein-described knob attachment, consisting of the two-part knob-spindle with confronting oblique faces, the knob having a socket for said spindle, and a fastening device located in the shank of said knob and bearing upon one of the right-angular side faces of said two-part spindle to force its parts together, substantially as described, and for the purpose specified.

CHARLES M. BURGESS.

Witnesses:
 THOS. BISHOP,
 M. S. WIARD.